United States Patent [19]

Yamazaki

[11] Patent Number: 5,613,727
[45] Date of Patent: Mar. 25, 1997

[54] SIDE SILL STRUCTURE FOR BODY OF MOTOR VEHICLE

[75] Inventor: Shouji Yamazaki, Wako, Japan

[73] Assignee: Honda Giken Kogyo Kabushiki Kaisha, Tokyo, Japan

[21] Appl. No.: 466,789

[22] Filed: Jun. 6, 1995

[30] Foreign Application Priority Data

Jul. 7, 1994 [JP] Japan .................................. 6-155965

[51] Int. Cl.⁶ .................................................. B60R 27/00
[52] U.S. Cl. ............................................. 296/188; 296/209
[58] Field of Search ...................................... 296/188, 209

[56] References Cited

U.S. PATENT DOCUMENTS

| | | | |
|---|---|---|---|
| 4,892,350 | 1/1990 | Kijima | 296/188 |
| 4,944,553 | 7/1990 | Medley et al. | 296/188 |
| 5,242,209 | 9/1993 | Yamauchi | 296/188 |

FOREIGN PATENT DOCUMENTS

| | | | |
|---|---|---|---|
| 58-87668 | 6/1983 | Japan . | |
| 64-18784 | 1/1989 | Japan . | |
| 406263062A | 9/1994 | Japan | 296/209 |

Primary Examiner—Gary C. Hoge
Attorney, Agent, or Firm—Armstrong, Westerman, Hattori, McLeland & Naughton

[57] ABSTRACT

In a body of a motor vehicle a cross member, provided on a floor panel of the body, elongating widthwise of the motor vehicle is connected to each side sill in a position which is offset from each center pillar. The side sill is provided therein with a reinforcing beam of closed cross section. The reinforcing beam extends in a range at least between a connecting portion of the cross member and a crossing portion of the center pillar and crosses the cross section of the side sill. The reinforcing beam is welded to the side sill over the entire length of the reinforcing beam.

4 Claims, 2 Drawing Sheets

SIDE SILL STRUCTURE FOR BODY OF MOTOR VEHICLE

BACKGROUND OF THE INVENTION

1. Field of the Invention

The present invention relates to the structure of a body of a motor vehicle and, in particular, to a side sill structure for the body of the motor vehicle.

2. Description of Related Art

As this kind of conventional structure, there is known one in Japanese Published Unexamined Patent Application No. 18784/1989. In this prior art, inside each side sill in which a front pillar, a center pillar and a rear pillar are respectively disposed in a manner extending upwards, there is contained a pipelike reinforcing member by supporting it near three crossing points between each of the pillars and the side sill.

In Japanese Published Unexamined Utility Model Registration Application No. 87668/1983, there is known the following structure. Namely, a pipelike member is contained inside each side sill by supporting the pipelike member on its both ends, and there is further filled a foamed material between the pipelike member and an internal wall of the side sill, thereby preventing the crippling of the side sill. In the description of this specification, such a member as will be provided on both widthwise sides of the body of the motor vehicle (e.g., a side sill, a center pillar) is sometimes expressed in terms of a singular form for the sake of simplicity. It should, however, be understood that such an expression is intended to denote "each" of such members where necessary.

Among the forces to act on the body of the motor vehicle, when an external force to push the center pillar, e.g., inwards of the body of the motor vehicle is acted on or operated, the external force is transmitted to a floor panel via the side sill. On the other hand, the floor panel is provided, for the purpose of reinforcement, with a cross member which extends in the widthwise direction of the body of the motor vehicle, by connecting it to the side sill. It follows that, when the external force is acted on the center pillar, the center pillar is supported by the cross member via the side sill. By the way, the cross member must on some occasions be offset from the center pillar due to the position of mounting a seat, or the like. If the cross member is offset from the center pillar, the external force to act on the center pillar acts, as a torsional moment, on that portion of the side sill which lies between the center pillar and the cross member. This will bring about a disadvantage in that the side sill in the shape of a box is deformed, resulting in a failure to sufficiently support the center pillar.

By the way, even if the pipelike reinforcing member is contained inside the side sill as in the above-described conventional structure, when the reinforcing member is supported on the side sill only at the three points, the side sill is not restrained by the reinforcing member in portions between respective supported points. Therefore, the twisting rigidity of the side sill is not increased much and, consequently, the external force acted on the center pillar cannot effectively be transmitted to the cross member. Though the crippling may be prevented by filling the clearance between the pipelike member and the internal wall of the side sill with the foamed material, the improvement in the twisting rigidity cannot be expected because the rigidity of the foamed material is low.

SUMMARY OF THE INVENTION

In view of the above-described problems, the present invention has an object of providing a side sill structure for a body of a motor vehicle, in which the side sill structure efficiently transmits an external force to act on the center pillar to the cross member by increasing the twisting rigidity of the side sill, whereby the supporting rigidity of the center pillar is increased.

In order to attain the above and other objects, the present invention is a side sill structure for a body of a motor vehicle in which a cross member, provided on a floor panel of the body, elongating widthwise of the motor vehicle is connected to each side sill in a position which is offset from each center pillar, characterized in: that the side sill is provided therein with a reinforcing beam of closed cross section which extends in a range at least between a connecting portion of the cross member and a crossing portion of the center pillar and which crosses the cross section of the side sill; and that the reinforcing beam is welded to the side sill over the entire length of the reinforcing beam.

According to the present invention, since that portion of the side sill which lies between the connecting portion of the cross member and the crossing portion of the center pillar is restrained by the reinforcing beam, it is not subject to twisting deformation, and the external force to act on the center pillar can be efficiently transmitted to the cross member via the side sill. In other words, it becomes possible to efficiently receive the external force to act on the center pillar by the cross member via the side sill, resulting in an increased supporting rigidity of the center pillar.

In this case, if the side sill is provided therein with a bulk head disposed in the connecting portion of the cross member and the reinforcing beam is connected to the bulk head, the supporting rigidity of the side sill can further be increased. In addition, the external force becomes to be more efficiently transmitted from the reinforcing beam to the cross member via the bulk head, with the result that the supporting rigidity of the center pillar can further be improved.

By the way, the crossing portion at which the center pillar crosses or joins the side sill is high in rigidity and will not be deformed even if an external force is applied thereto. Therefore, the reinforcing beam needs not cover the entire range of the crossing portion of the center pillar. Instead, if an end, on the side of the center pillar, of the reinforcing beam is positioned in a range defined by both ends, as seen in the longitudinal direction of the motor vehicle, of the crossing portion of the center pillar, the external force from the center pillar can be received or sustained. As a result, the weight of the body of the motor vehicle can be reduced without decreasing the supporting rigidity of the center pillar.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF A PREFERRED EMBODIMENT

Figure 1:
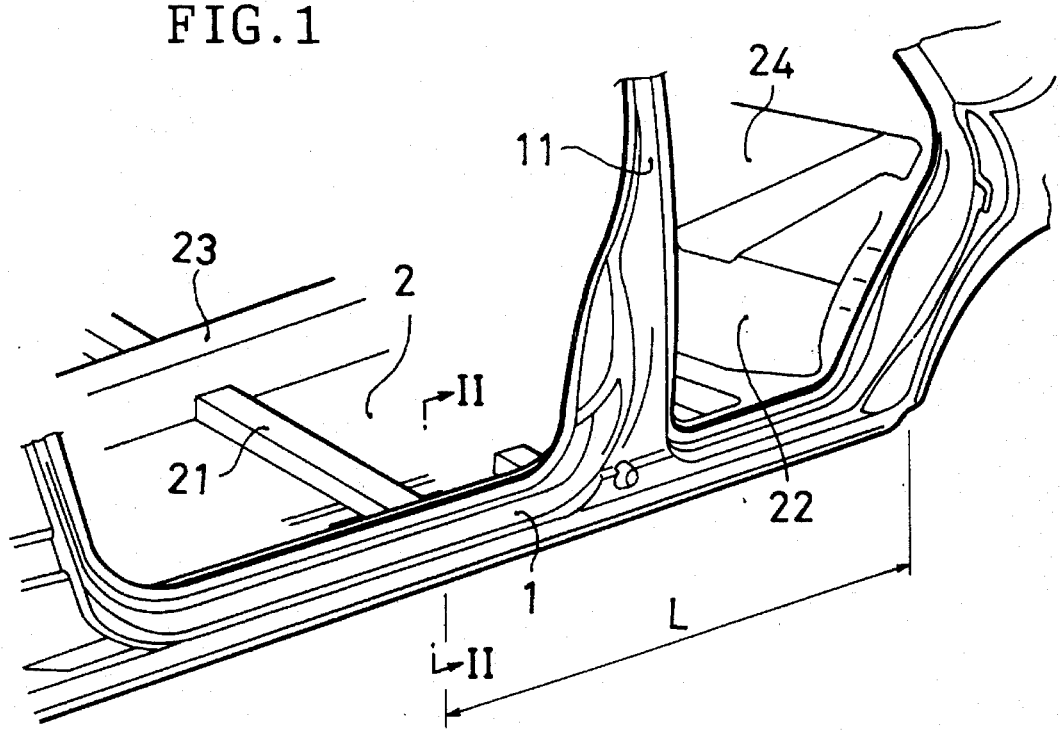
FIG. 1 is a perspective view showing the constitution of an embodying example of the present invention.
Figure 2:
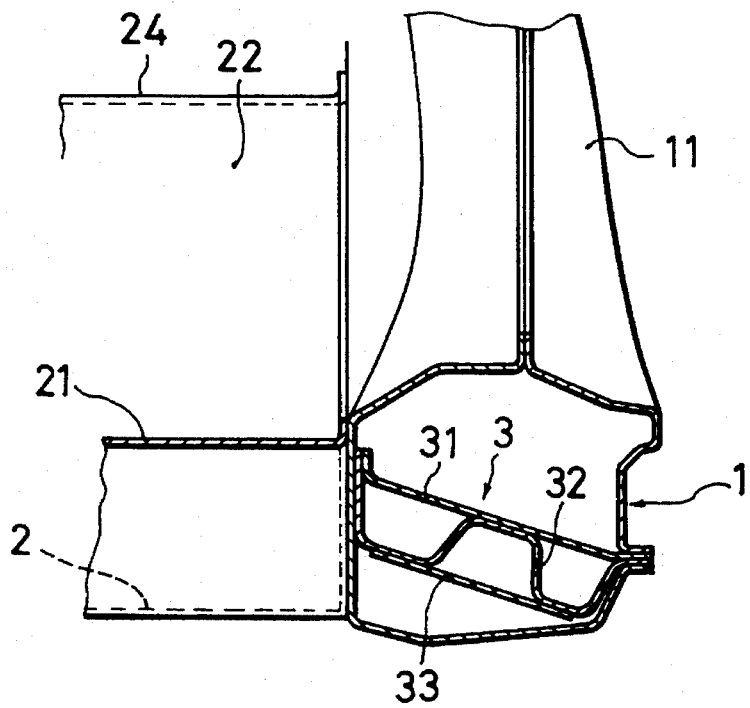
FIG. 2 is a cross-sectional view taken along the line II—II in FIG. 1.

By referring to FIGS. 1 and 2, numeral 1 denotes a side sill which is respectively formed on the right and the left sides of a body of a motor vehicle. A center pillar 11 is provided so as to extend upwards from an approximately central portion of the side sill. To this side sill 1 there is welded a floor panel 2 which constitutes a floor of a chamber or a compartment of the motor vehicle. In the floor panel 2 there is formed, for reinforcement, a cross member 21 by means of pressing so as to extend widthwise of the body of the motor vehicle in a position which is offset towards the front of the center pillar 11. This cross member 21 is connected to a member called a floor tunnel 23. In the rear portion of the floor panel 2 there is formed a cross member 22 which serves as a rising or upwardly extending wall to connect a rear floor 24 and the floor panel 2 and which reinforces the body of the motor vehicle. Inside the side sill 1 there is welded a reinforcing beam 3 over the entire length within a range L which lies between both the cross members 21, 22. This reinforcing beam 3 is formed into a closed cross section by sandwiching a corrugated plate member 32 (i.e., approximately W in cross section) by two band members 31, 33 and welding the three members together. The reinforcing beam 3 crosses the cross section of the side sill 1 and is welded to the side sill 1 over the entire range L as described above.

Figure 3:
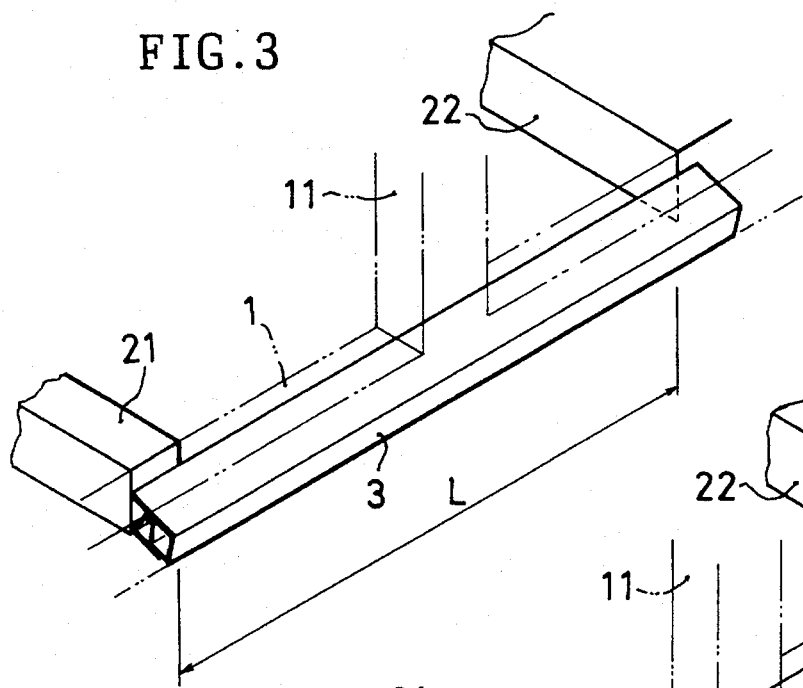
FIG. 3 is a schematic view showing the relationship between the reinforcing beam and the cross members.

The relationship between both the cross members 21, 22 and the reinforcing beam 3 can be schematically illustrated as shown in FIG. 3. Even if an external force towards the inside of the chamber of the motor vehicle may be applied to the center pillar 11, the side sill 1 is not subject to twisting deformation because the twisting rigidity of the side sill 1 is increased by the reinforcing beam 3. Consequently, the center pillar 11 is not bent towards the chamber but is supported by both the cross members 21, 22.

Figure 4:
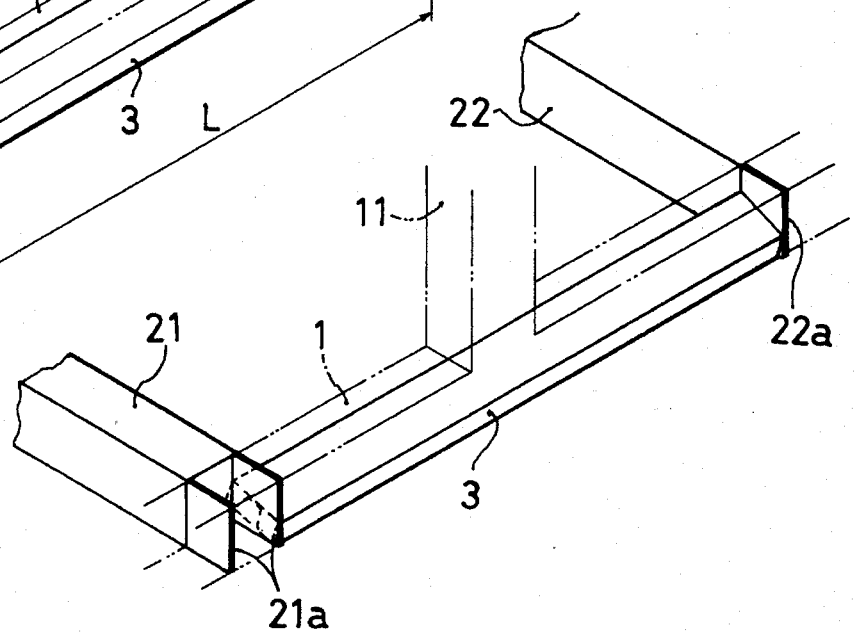
FIG. 4 is a schematic view showing the relationship between the reinforcing beam and the cross members in a second embodiment of the present invention.

By the way, the following arrangement may also be employed as shown in FIG. 4. Namely, inside the side sill 1 there are provided a bulkhead 21a which is connected to the cross member 21 and a bulkhead 22a which is connected to the cross member 22, and both ends of the reinforcing beam 3 are welded to the bulkheads 21a, 22a. By thus providing the bulkheads 21a, 22a and welding the reinforcing beam 3 to the bulkheads 21a, 22a, the twisting rigidity of the side sill 1 can further be increased.

Figure 5:
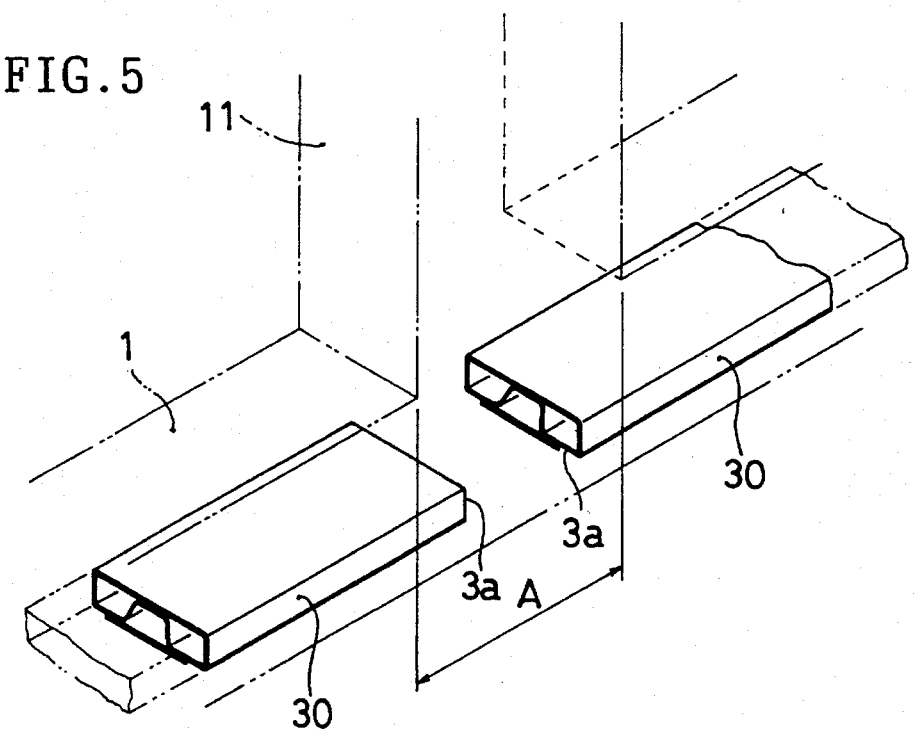
FIG. 5 is a schematic view showing the position of ends of the reinforcing beams in a third embodiment of the present invention.

In either of the embodying examples shown in FIGS. 3 and 4, a single piece of relatively long reinforcing beam 3 which extends over the entire range L is welded to the inside of the side sill 1. However, since the crossing portion of the side sill 1 and the center pillar 11 is provided with a stiffener (not shown), the rigidity thereof has already been increased. It follows that a sufficient rigidity will be obtained without attaching the reinforcing beam 3, as shown in FIG. 5, to a range A between both ends, as seen in the longitudinal direction of the motor vehicle, of the crossing portion of the center pillar 11. Therefore, by using two relatively short reinforcing beams 30 disposed in the longitudinally front and rear positions, there may exist a portion having no reinforcing beam within the range A. In this case, however, those ends 3a of the reinforcing beams 30 which are on the side of the center pillar 11 must lie, or be positioned, inside the range A. By thus providing a portion which is free from the reinforcing beam, the weight of the body of the motor vehicle can be reduced without lowering the twisting rigidity of the side sill 1.

It is readily apparent that the above-described side sill structure for a body of a motor vehicle meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A side sill structure for a body of a motor vehicle comprising:
    a side sill extending longitudinally of the motor vehicle, said side sill having a first wall and a second wall spaced from said first wall;
    a center pillar extending from said side sill at a first connecting portion;
    a cross member extending transversely of the motor vehicle and connected to said side sill at a second connecting portion, which is offset longitudinally from said first connecting portion;
    a hollow reinforcing beam of closed cross section extending at least between said first connecting portion and said second connecting portion, and which extends between said first wall and said second wall and is attached to said first wall and to said second wall; and
    wherein the reinforcing beam is welded to the side sill over the entire length of the reinforcing beam.

2. A side sill structure for a body of a motor vehicle according to claim 1, wherein the side sill is provided therein with a bulkhead disposed in the second connecting portion and wherein the reinforcing beam is connected to the bulkhead.

3. A side sill structure for a body of a motor vehicle according to claim 1, wherein the reinforcing beam is discontinuous in the region of the first connecting portion.

4. A side sill structure for a body of a motor vehicle according to claim 2, wherein the reinforcing beam is discontinuous in the region of the first connecting portion.

* * * * *